United States Patent
Suda et al.

(10) Patent No.: US 6,770,188 B2
(45) Date of Patent: Aug. 3, 2004

(54) PART FABRICATING METHOD

(75) Inventors: Masayuki Suda, Chiba (JP); Naoya Watanabe, Chiba (JP); Kazuyoshi Furuta, Chiba (JP)

(73) Assignee: Seiko Instruments Inc., Chiba (JP)

( * ) Notice: Subject to any disclaimer, the term of this patent is extended or adjusted under 35 U.S.C. 154(b) by 21 days.

(21) Appl. No.: 10/045,563

(22) Filed: Jan. 11, 2002

(65) Prior Publication Data

US 2002/0092776 A1 Jul. 18, 2002

(30) Foreign Application Priority Data

Jan. 16, 2001 (JP) .......................................... 2001-007329
Jul. 2, 2001 (JP) .......................................... 2001-200306
Nov. 15, 2001 (JP) .......................................... 2001-350641

(51) Int. Cl.[7] ............................. B23H 11/00; B23H 3/00
(52) U.S. Cl. ....................... 205/640; 205/665; 205/666; 205/667; 216/41; 216/43; 216/44; 204/224 M
(58) Field of Search ................................. 205/640, 665, 205/666, 667; 216/41, 43, 44; 204/224 M

(56) References Cited

U.S. PATENT DOCUMENTS 5,968,336 A * 10/1999 Rolfson ...................... 205/656
5,976,347 A * 11/1999 Wakabayashi et al. ...... 205/640
6,350,360 B1 * 2/2002 Bonivert et al. .............. 205/67

* cited by examiner

Primary Examiner—Wesley A. Nicolas
(74) Attorney, Agent, or Firm—Adams & Wilks

(57) ABSTRACT

A structural body material layer is formed directly on a base substrate or via a sacrificing layer or a peeling layer, a groove is fabricated electrochemically along an outer configuration shape of a part constituting an object at the structural body material layer and thereafter, only the sacrificing layer or the base substrate is selectively removed or the part is mechanically separated from the peeling layer to thereby separate the part and the base substrate and provide the part constituting the object or fabricate a part having a movable portion by partially restricting a portion to be separated.

24 Claims, 13 Drawing Sheets

202

201

PART FABRICATING METHOD

BACKGROUND OF THE INVENTION

1. Field of the Invention

The present invention relates to a method of fabricating a part comprising a conductive material and a part used in a sensor, an actuator or the like, comprising a conductive material and including a structure having a movable portion in the fields of a metal industry, a chemical industry, an electronic industry, a machine industry and the like.

2. Description of the Related Art

A conventional method of fabricating a part with a desired shape is generally performed by removing an unnecessary portion of a fabricating material utilizing mechanical machining technology or electric discharge machining technology. In a method utilizing mechanical machining technology, such as a cutting tool, by rotating either the cutting tool or the fabricating material and, at the same time, bringing the cutting tool and the fabricating material into contact with each other, the unnecessary portion of the fabricating material is removed to thereby finally obtain a part having a desired shape. Meanwhile, in a method utilizing electric discharge machining, a machining electrode having a front end shape in correspondence with a desired fabricating shape is produced, an interval between the machining electrode and the fabricating material is adjusted to a predetermined distance and by repeatedly producing an electric discharge in a pulse-like shape therebetween, a desired shape is achieved by removing the unnecessary portion of the fabricating material to thereby fabricate a part.

Meanwhile, a method of fabricating a part partially including a movable portion is generally performed by fabricating the individual elements utilizing various fabrication technologies such as mechanical machining technology and electricity discharge machining technology, described above, and thereafter, assembling the elements.

Further, in addition to such methods, and as shown by FIG. 3 and FIG. 4, there is generally used a method of forming a movable portion by a method of patterning a thin film or a thick film deposited on a substrate in a layered shape by photolithography. When the movable portion is formed by the method shown in FIG. 3 and FIG. 4, the following procedure is carried out.

At a portion of a flat base substrate 101, there is deposited a sacrificing layer 102 comprising a material different from that of the base substrate 101 by a predetermined thickness (FIG. 3(B)). Further, on the sacrificing layer 102, there is deposited a structural body material layer 103 comprising a material different from that of the sacrificing layer 102 by a predetermined thickness (FIG. 3(C)). Successively, the structural body material layer 103 is patterned into a desired shape.

First, a photoresist 301 is coated on the structural body material layer 103 (FIG. 3(D)) and light is irradiated to the photoresist 301 via a photomask 302 having a pattern to be formed at the structural body material layer 103 to thereby expose the photoresist 301 (FIG. 3(E)). Thereafter, there is formed a mask pattern for patterning the structural material layer 103 on the photoresist 301 by being subjected to steps of development, rinsing, post baking and so on (FIG. 4(A)). In such a state, the substrate is dipped in an etching solution for dissolving the structural body material layer 103 to thereby etch a portion of the structural material layer 103 that is not coated by the photoresist 302. When there is constituted a state (FIG. 4(B)) in which the portion of the structural body material layer 103 which is not coated by the, photoresist 302 is penetrated to reach the sacrificing layer 102, successively, the substrate is dipped in an etching solution which does not dissolve the base substrate 101 and the structural body material 103 and selectively dissolves only the sacrificing layer 102 to thereby remove the sacrificing layer 102 formed at the step of FIG. 3(B) (FIG. 4(C)). Finally, the photoresist 301 is removed and in, a structural body material layer 103 a movable portion 202 that is not tightly attached to the base substrate 101 can be formed (FIG. 4(D)). In a state shown by FIG. 4(D), a quadrangle of the movable portion 202 is only connected to a structural body fixing portion 201 via narrow beams and therefore, when force is applied to the movable portion 202, the movable portion 202 is moved relatively to the base substrate 101 only by an amount in proportion to the force. Such a structure is utilized in, for example, a pressure sensor or an acceleration sensor.

However, there are a number of problems in the conventional part fabricating method. When the mechanical machining technology is utilized to the part fabricating method, there are following problems.

(1) Most of the fabricating material is removed and wasted to make a final shape of a part. Further, a long fabrication period of time is taken.

(2) A machinable shape is restricted depending on a kind of a fabricating machine used and therefore, in the case of fabricating a part having a complicated shape, many kinds of fabricating machines are needed and a number of steps of fabrication increases.

(3) The machining is carried out by bringing the cutting tool and the fabrication object into contact with each other and therefore, dissipation of the cutting tool is unavoidable. When the cutting tool is dissipated, there are problems caused, in that accuracy of fabrication is deteriorated, a fabricating surface is roughened and so on, therefore, the cutting tool is changed as necessary.

(4) Since fabrication is carried out by utilizing physical force produced between the cutting tool and the fabrication object and therefore, machinability is affected to hardness and tenacity of the fabrication material. Therefore, kinds and fabrication conditions of the cutting tool need to adjust in proportion to the material of the fabrication object.

(5) Smaller tip size of the cutting tool gives higher tip resolution of fabrication. However, there is a limit in miniaturizing tip size of the cutting tool because fabrication is carried out utilizing physical force. Further, similarly, it is necessary that the fabrication object is not deformed by the physical force operated in fabrication and therefore, there is a limit in a size of a machinable part.

Next, when the electro discharge machining technology is utilized to the part fabricating method, there are following problems.

(1) The fabrication shape is determined by the shape of the machining electrode, and therefore, it is necessary to fabricate the machining electrode having a appropriate shape in correspondence with a desired shape of machining. Usually, in fabricating the machining electrode, a wire cut electro discharge machine is used, two kinds of electro discharge machines are needed for fabricating the machining electrode and fabricating the part. Therefore, fabrication cost is increased.

(2) Similarly to mechanical machining, dissipation of the machining electrode is unavoidable and the machine electrode is changed as necessary. Further, in fabrication, position of the machining electrode has to be controlled in consideration of dissipation of the machining electrode. Therefore, the control method becomes complicated.

(3) In most of the cases, similarly to mechanical machining, most of the fabrication material is removed and wasted to make a final shape of a part. A long period of fabrication time is taken.

(4) In order to create a discharge, a high voltage needs to be applied, and therefore, energy consumption in fabrication is considerable. Further, there is a risk of producing a damaged layer on the surface after fabrication by discharge.

Further, in the case of fabricating a part that includes a movable portion according to the conventional method, the following problems have arisen. First, in the case of the method which includes the process of fabricating the individual elements constituting the part by utilizing various fabrication technologies such as mechanical machining technology or electro discharge machining technology, and the assembling the individual elements, there is a need to assemble the individual elements. Therefore, as a size of a part becomes smaller, a size of an element for constituting the part also becomes smaller, and there is a problem in that the element is distracted in assembling, or the element cannot be assembled while maintaining accuracy. In order to resolve such problems, it is necessary to use a manipulator that is capable of fine positioning operation. This makes fabrication cost higher.

Next, in the case of forming movable portion of a part by the method of patterning a thin film or a thick film deposited on a substrate in shape of a layer by photolithography, the method better previous methods because the assembly operation is not needed, and is effective even when a part is downsized.

However, in the case of the foregoing method, when the thickness of the structural body material 103 is increased, in the step of a etching the structural body material 103 shown in FIG. 4(B), there are problems in that by etching the substrate down to a lower side of the resist pattern *undercut), accuracy of a shape of the pattern is deteriorated and the substrate is dipped in the etching solution for a long period of time and therefore, there is needed a resist material having a resistance against the etching solution for the time period and so on. Among them, with regard to the former, the problem can be avoided by adopting a method of using a material or an etching solution having an anistotropy in the etching direction, however, in such a case, it is necessary to use a material having such a property in the structural body material 103 and therefore, a width of selecting the material is narrowed. Further, in order to expose the photoresist 301 to a desired pattern, it is necessary to previously fabricate the photomask 302 in conformity therewith and it is extremely difficult to fabricate a shape of the structural body material 103 in an arbitrary shape at the site. For example, in the case of optimizing the shape of the structural body material 103 in view of characteristics after fabrication, it is necessary to form a number of photomask patterns beforehand and there poses a problem that much of time and cost is take to achieve an optimum result.

SUMMARY OF THE INVENTION

According to the method of fabricating a part of the invention, there is provided means for resolving the above-described problem.

According to a first aspect of the invention, there is provided a method of fabricating a part comprising a sacrificing layer forming step of depositing a layer of a material for constituting a sacrificing layer on a surface of a base material, a structural body material layer forming step of depositing a layer for constituting a material of a part structural body different from the sacrificing layer on a surface of the sacrificing layer, a part shape fabricating step of the structural body material layer along an outer configuration shape of the part, and a part separating step of separating the structural body material fabricated in an outer configuration of the part from the base material by selectively removing only the sacrificing layer, wherein the part shape fabricating step is carried out by a chemical fabricating process.

According to a second aspect of the invention, there is provided a method of fabricating a part comprising a structural body material layer forming step of depositing a layer for constituting a material of a part structural body different from a base material on a surface of the base material, a part shape fabricating step of fabricating the structural body material layer along an outer configuration shape of the part, and a part separating step of separating the structural body material fabricated in an outer configuration of the part from the base material by selectively removing a portion or a total of the base material, wherein the part shape fabricating step is carried out by a chemical fabricating process.

Further, according to a third aspect of the invention, there is provided a method of fabricating a part comprising a peeling layer forming step of forming a peeling layer on a surface of a base material by subjecting the base material to a surface treatment, a structural body material layer forming step of depositing a layer for constituting a material of a part structural body on a surface of the peeling layer, a part shape fabricating step of fabricating the structural body material layer along an outer configuration shape of the part, and a step of separating the structural body material fabricated in an outer configuration of the part from the base material at the surface of the peeling layer, wherein the part shape fabricating step is carried out by a chemical fabricating process.

Further, according to a fourth aspect of the invention, there is provided in the method of fabricating a part according to any one of the first to the third aspects, wherein the part shape fabricating step includes a step of separating only the part from the structural body material layer by forming a groove having a predetermined width at the structural body material layer along the outer configuration shape of the part by a chemical fabricating process.

Further, according to a fifth aspect of the invention, there is provided a method of fabricating a part wherein in the fourth aspect of the method of fabricating a part, the chemical fabricating process used in the part shape fabricating step comprising a step of arranging a machining electrode having a pertinent shape in a machining solution oppositely to the structural body material layer, and a step of moving at least one of the machining electrode and the structural body material layer relatively to each other by a path in correspondence with a shape to be fabricated while applying a pertinent voltage between the structural body material layer and the machining electrode.

Further, according to a sixth aspect of the invention, there is provided a method of fabricating a part constituted by a base material and a structural body material layer formed thereon, a portion of the structural body material layer forming a structural body fixing portion which is tightly attached to the base material and the structural body material layer except the structural body fixing portion not being tightly attached to the base material and including a movable structure capable of changing a position thereof relative to the base material, the method comprising a sacrificing layer forming step of depositing a layer of a material, for constituting a sacrificing layer on a surface of the base material, a structural body fixing portion forming step of forming the structural body fixing portion by exposing the surface of the base material by removing a portion of the sacrificing layer a structural body material layer forming step of depositing a layer for constituting a material of a part structural body different from the sacrificing layer on surfaces of the sacrificing layer and the structural body fixing portion, a movable portion shape fabricating step of fabricating the structural body material layer along an outer configuration shape of the movable portion, and a movable portion separating step of separating the structural body material layer except the structural body fixing portion from the base material by selectively removing only the sacrificing layer, the movable portion shape fabricating step is carried out by a chemical fabricating process.

Further, according to a seventh aspect of the invention, there is provided a method of fabricating a part constituted by a base material and a structural body material layer formed thereon, a portion of the structural body material layer forming a structural body fixing portion which is tightly attached to the base material and the structural body material layer except the structural body fixing portion not being tightly attached to the base material and including a movable structure capable of changing a position thereof relative to the base material, the method comprising a sacrificing layer forming step of depositing a layer of a material for constituting a sacrificing layer on a surface of the base material except an area for constituting the structural body fixing portion, a structural body material layer forming step of depositing a layer for constituting a material of a structural body different from the sacrificing layer on surfaces of the sacrificing layer and the structural body fixing portion, a movable portion shape fabricating step of fabricating the structural body material layer along an outer configuration shape of a movable portion, and a movable portion separating step of separating the structural body material layer except the structural body fixing portion from the base material by selectively removing only the sacrificing layer, and the movable portion shape fabricating step is carried out by a chemical fabricating process.

Further, according to an eighth aspect of the invention, there is provided a method of fabricating a part constituted by a base material and a structural body material layer formed thereon, a portion of the structural body material layer forming a structural body fixing portion which is tightly attached to the base material and the structural body material layer except the structural body fixing portion not being tightly attached to the base material and including a structure capable of changing a position thereof relative to the base material, the method comprising a peeling layer forming step of forming a peeling layer on a surface of the base material except an area for constituting the structural body fixing portion, a structural body material layer forming step of depositing a layer for constituting a material of a structural body on surfaces of the peeling layer and the structural body fixing portion, a movable portion shape fabricating step of fabricating the structural body material layer along an outer configuration shape of a movable portion, and a movable portion separating step of separating the structural body material layer except the structural body fixing portion from the base material at the surface of the peeling layer, wherein the movable portion shape fabricating step is carried out by a chemical fabricating process.

Further, according to a ninth aspect of the invention, there is provided a method of fabricating a part, wherein in the method of fabricating a part according to the sixth through the eighth aspects, the movable portion shape fabricating step includes a step of forming a shape of the movable portion in the structural body material layer by forming a groove having a predetermined width in the structural body material layer along an outer configuration shape of the movable portion by a chemical fabricating process.

Further, according to a tenth aspect of the invention, there is provided a method of fabricating a part, wherein in the ninth aspect of the method of fabricating a part, the chemical fabricating process used in the part shape fabricating step comprising a step of arranging a machining electrode having a pertinent shape in a machining solution oppositely to the structural body material layer, and a step of moving at least one of the machining electrode and the structural body material layer relatively to each other by a path in correspondence with a shape to be fabricated while applying a pertinent voltage between the structural body material layer and the machining electrode.

DESCRIPTION OF THE PREFERRED EMBODIMENTS

First, FIG. 1 shows an outline of a method of fabricating a part in the case of not including a movable structure. First, on a base substrate 101 for fabricating a part, there is formed a layer of a conductive material for constituting a sacrificing layer 102 (or sacrificial layer) (FIG. 1(B)). Further, on a surface of the sacrificing layer 102, there is deposited structural body material layer 103 different from the sacrificing layer 102 and having a conductivity (FIG. 1(C)).

Figure 1A:
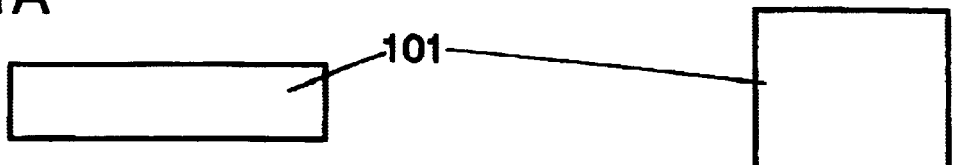
FIGS. 1A–1F are schematic views showing an outline of fabricating steps when a part that does not includes a movable portion is fabricated by a method of fabricating a part according to the invention.
Figure 1B:
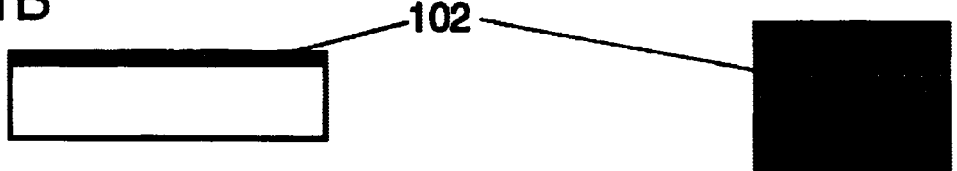
Figure 1C:
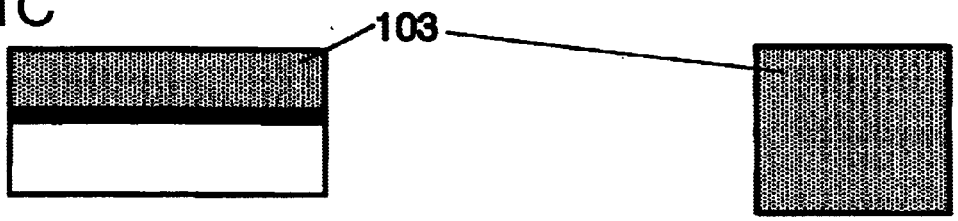
Figure 1D:
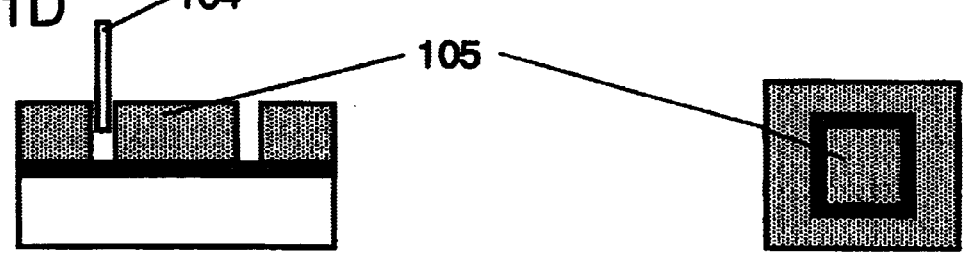

Next, there is machined a material layer along an outer configuration shape of a part constituting an object in this case, the substrate in the state of FIG. 1(C) is dipped in a machining solution and fabrication is carried out by utilizing an electrolytic machining method. There is selected the machining solution used suitable for carrying out the electrolytic machining selectively for only the structural body material. Specifically, first, a machining electrode 104 having a diameter of a front end portion thereof suitable for fabricating to shape the structural body material layer 103 with necessary accuracy and resolution of fabrication, is made to be proximate to a portion of the structural body material layer 103 to be fabricated and pertinent voltage is applied between the machining electrode 104 and structural body material layer 103. There is selected voltage applied, here having pertinent frequency, waveform and so on in proportion to a kind of the structural body material layer 103 and a shape of fabrication. Further, the voltage is applied while moving the machining electrode 104 and the base substrate 101 relative by to each other along a shape that the front end of the machining electrode 104 is to be machined. When, a thickness of the structural body material layer 103 is thick, it is necessary to repeat the step of moving the machining electrode along the shape while applying the voltage by a plurality of times, in such a case, a groove is formed in the structural body material layer 103 by a step immediately therebefore and therefore, in proportion to an amount of depth of groove, a distance between the front end of the machining electrode 104 and base substrate 101 is adjusted. The step is repeated until the structural body material layer 103 is brought into a state in which the groove has been machined to penetrate by a shape constituting the object (FIG. 1(D)).

Figure 1E:
Figure 1F:

Thereafter, the substrate is dipped in an etching solution for selectively dissolving only the sacrificing layer 102 to thereby remove the sacrificing layer 102 formed by the step of FIG. 1(B) (FIG. 1(E)). By selectively dissolving only the sacrificing layer 102, only a part 105 is separated from the structural body material layer 103 (FIG. 1(F)).

Although according to the method explained here, the sacrificing layer 102 is used for separating the part 105 formed in the structural body material layer 103 from the base substrate 101, a similar result is achieved also by using a method of depositing a material in which although the material is provided with high adherence with the base substrates 101, adherence thereof with the, structural body material layer 103 is not so strong, on the base substrate 101, in place of the sacrificing 102 and using the material as a peeling layer to thereby separate the part 105 from the base substrate 101 after electrolytic machining.

Meanwhile, FIG. 2 shows an outline of a method of fabricating a part in the case of including a movable structure at a portion of the part. First, there is deposited the sacrificing layer 102 comprising a material different from that of the base substrate 101 on the base substrate 101 (FIG. 2(B)). Next, a portion of the sacrificing layer 102 is removed to thereby bring about a state of exposing a surface of the base substrate 101 (FIG. 2(C)). In this case, an exposed portion of the base substrate 101 finally constitutes a structural body fixing portion 201. Next, there is deposited a predetermined thickness of the structural body material layer 103 comprising a material different from that of the sacrificing layer 102 on the sacrificing layer 102 (FIG. 2(D)).

Successively, the structural body material layer 103 is machined into a desired shape by using the electrolytic machining method. The machining electrode 104 having a diameter of a front end portion thereof suitable for machining to shape the structural body material layer 103 with necessary accuracy and resolution of fabrication, is made proximate to a portion of the structural body material layer 103 to be fabricated and pertinent voltage is applied between the, machining electrode 104 and the structural body material layer 103. There is selected voltage applied here having pertinent frequency and waveform in proportion to a kind and a shape of a fabrication of the structural body material layer 103. Further, the voltage is applied while moving the machining electrode 104 and the base substrate 101 relative to each other along a shape which a front end of the machining electrode 104 is to be machined. When a thickness of the structural material layer 103 is thick, it is necessary to repeat the step of moving the machining electrode along the shape while applying the voltage by a plurality of times and in such a case, since a groove is formed at the structural body material layer 103 by a step immediately therebefore, a distance between the front end of the machining electrode 104 and the base substrate 101 is adjusted in proportion to an amount of depth of the groove. The step is repeated until a state in which the groove has been machined to penetrate the structural body material layer 103 finally by a shape constituting an object (FIG. 2(E)).

Figure 2A:
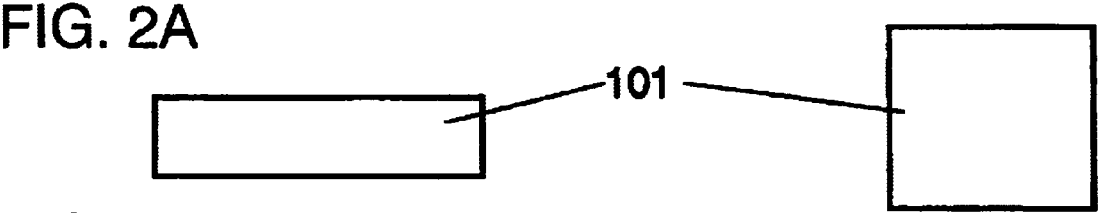
FIGS. 2A–2F are schematic views showing an outline of fabricating steps when a part that includes a movable portion is fabricated by a method of fabricating a part according to the invention.
Figure 2B:
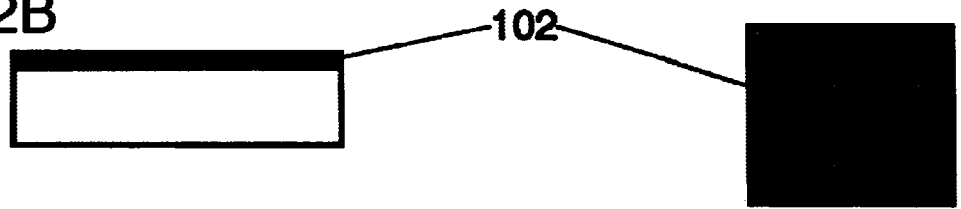
Figure 2C:
Figure 2D:
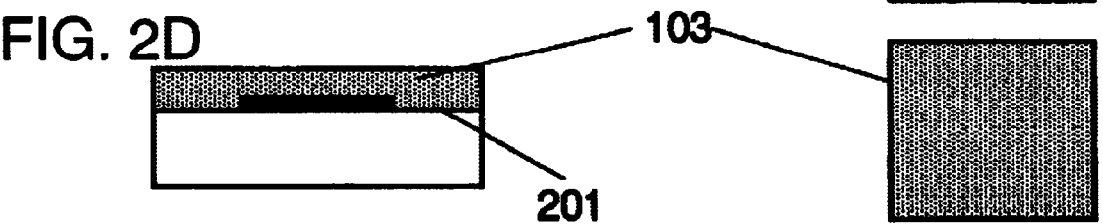
Figure 2E:
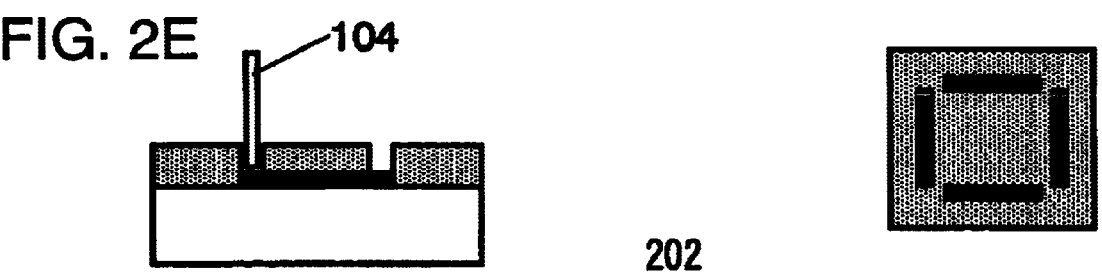
Figure 2F:
Figure 3A:
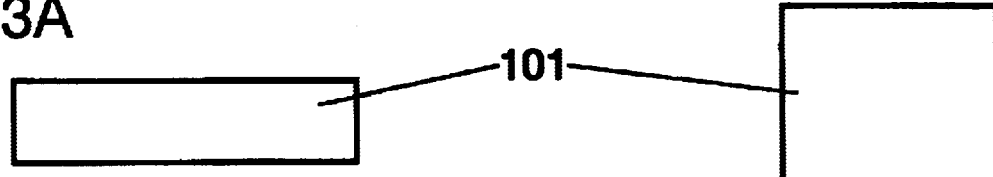
FIGS. 3A–3E are schematic views showing fabricating steps of an example of a conventional method of fabricating a part including a movable portion.
Figure 3B:
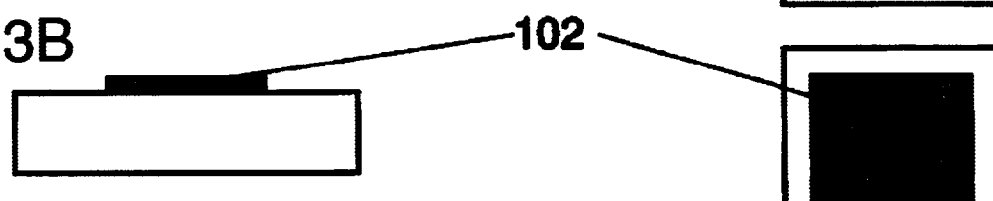
Figure 3C:
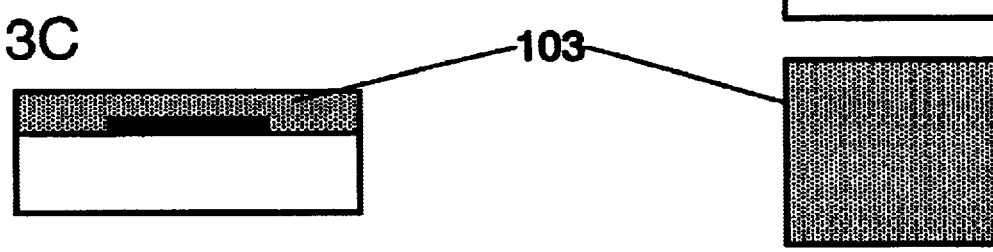
Figure 3D:
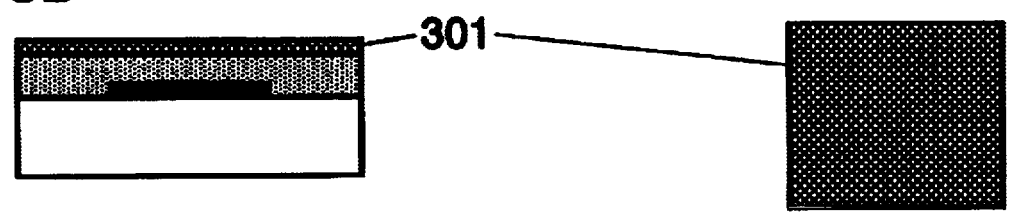
Figure 3E:
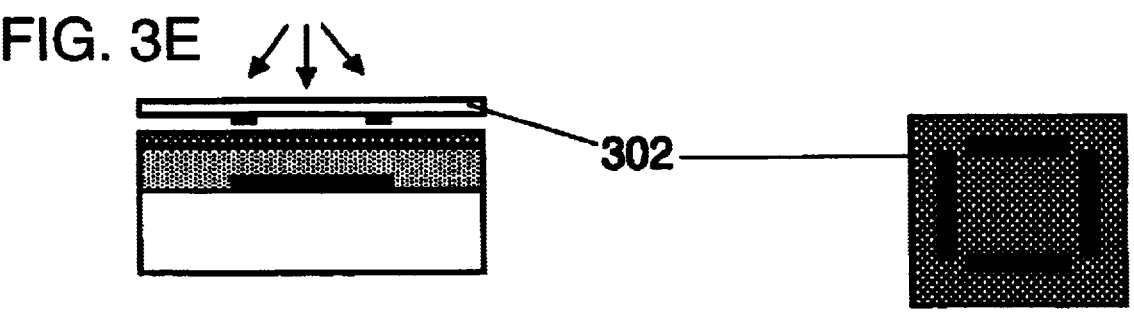
Figure 4A:
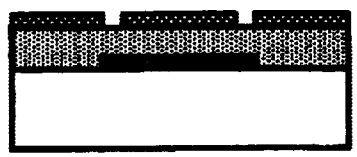
FIGS. 4A–4D are schematic views showing continuation of the fabricating steps of the example of the conventional method of fabricating a part including a movable portion.
Figure 4A:
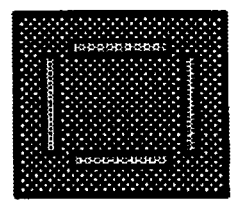
Figure 4B:
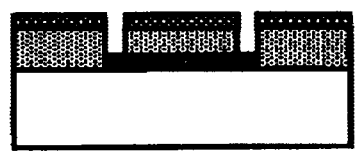
Figure 4B:
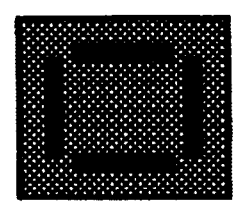
Figure 4C:
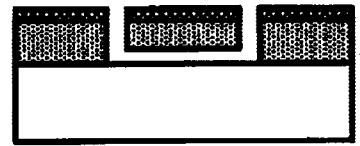
Figure 4C:
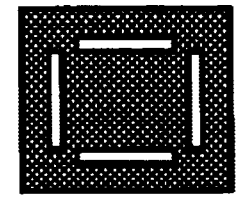
Figure 4D:
Figure 4D:
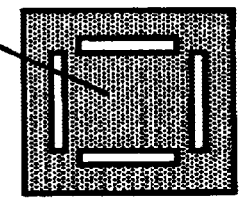

Thereafter, the substrate is dipped in an etching solution for selectively dissolving only the sacrificing layer 102 to thereby remove the sacrificing layer 102 formed at the step of FIG. 2(B) (FIG. 2(F)). By selectively dissolving only the sacrificing layer 102, a movable portion 202 is formed in the structural body material layer 103.

Although according to the method explained here, the sacrificing layer 102 is used for separating the movable portion 202 formed in the structural body material layer 103 from the base substrate 101, a similar result is achieved also by using the method of depositing a material in which although the material is provided with high adherence with the base substrate 101, adherence thereof with the structural body material layer 103 is not so strong, on the base substrate 101, in place of the sacrificing layer 102 and using the material as a peeling layer to thereby separate the movable portion 202 from the base substrate 101 after electrolytic machining.

Further, in the above-described method, when a wet type process such as plating is used in forming the sacrificing layer 102, in forming the structural body material layer 103 and in forming the peeling layer, all of the steps can be carried out in an apparatus the same as that of electrolytic machining. However, the invention is not limited thereto but a similar result can be achieved even by using a thin film forming process such as vacuum deposition, a sputtering method, a CVD method or the like.

Next, a detailed explanation will be given of embodiments of the invention in reference to the drawings.

Embodiment 1

According to the embodiment, an explanation will be given of a case of fabricating a part which does not include a movable portion by using a chromium substrate as a base substrate, a copper thin film as a sacrificing layer and a nickel thick film as a structural body material layer.

FIG. 5 shows an outline of a process in the case of fabricating a part that does not include a movable portion by a method of fabricating a part according to the invention.

Figure 5A:
FIGS. 5A–5F are schematic views showing an example of a case fabricating a part that does not include a movable portion according to Embodiment 1 of the method of fabricating a part according to the invention.
Figure 5B:

First, there is formed a copper thin film 502 for constituting a sacrificing layer by electroplating in a solution including copper cyanide on a surface of a chromium substrate 501 for constituting a base substrate (FIG. 5(B)). In this step, a general copper plating bath can be used. Although a thickness of the sacrificing layer is preferable as thin as possible, when there is pin hole or non-uniformity in plating, a structural body material layer and the base substrate cannot be separated from each other at a later step and therefore, it is preferable to constitute a thickness of about 0.5 through several micrometers, however, the thickness is not limited thereto.

Figure 5C:
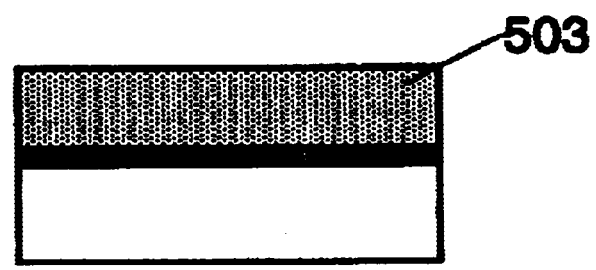

Next, there is formed a nickel thick film 503 for constituting a structural body material layer by electroplating in a solution including nickel sulfamate on a surface of the copper thin film 502 (FIG. 5(C)). In this case, it is necessary to make a film thickness of the nickel thick film, the same as a thickness of a finished part. Although according to the embodiment, a thickness of a part to be formed is comparatively large, therefore, the nickel sulfamate bath that provides a plating film having small internal stress issued. There can also be used other plating bath capable of forming a film having small internal stress. Further, when a thickness of a finished part is thin, the thickness of the material layer becomes also thin, therefore, there can be used other plating bath, for example, Watt bath or nickel chloride bath which is used generally. Further, there can also be used a method except plating, for example, a vacuum deposition method or a sputtering method.

Figure 5D:
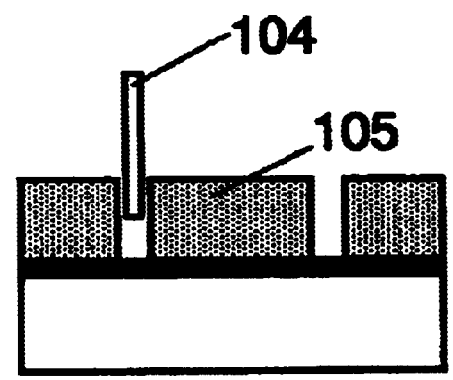
Figure 5E:
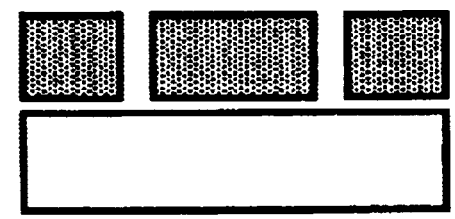
Figure 5F:

Next, a groove having predetermined width and depth is fabricated along an outer consideration shape of a part constituting an object at the nickel thick film 503 by using a machining electrode 104 (FIG. 5(D)). Thereby, the nickel thick film 503 is separated into the part 105 and other portion. Finally, by removing only the copper thin film 502 (FIG. 5(E)), the part 105 is separated from the chromium substrate 501 (FIG. 5(F)). According to a method of selectively removing the copper thin film 502, the substrate is dipped in a solution which does not dissolve nickel and chromium but dissolves only copper, or the substrate is electrochemically etched by applying voltage for selectively dissolving only copper.

Although according to the embodiment, there are used chromium as the material of the base substrate, copper as the material of the sacrificing layer and nickel as the structural body material layer, other materials can also be used when the following conditions are satisfied.

(1) A base substrate having conductivity can be used (2) A sacrificing layer can be used so far as a material thereof is provided with conductivity and excellent adherence with the base material or the part material and capable of being selectively removed without influencing the base material or the part material in removing the material.

(3) A structural body material layer can be used so far as a material thereof is the material capable of being deposited to a final thickness of a part and a material capable of selectively removing a portion thereof by electrochemical reaction.

Further, the machining electrode 104 needs to be constituted by a material having conductivity and chemically stable in the machining solution and provided with a shape and a size suitable for fabricating a shape constituting an object in a part shape fabricating step.

Embodiment 2

According to the embodiment, an explanation will be given of a case of fabricating a part which does not include a movable portion by using a chromium substrate as a base substrate, and using a nickel thick film as a structural body material layer.

FIG. 6 shows an outline of a process when a part is fabricated by a method of fabricating a part according to the invention.

Figure 6A:
FIGS. 6A–6E are schematic views showing an example of a case of fabricating a part that does not include a movable portion according to Embodiment 2 of the method of fabricating a part according to the invention.
Figure 6B:
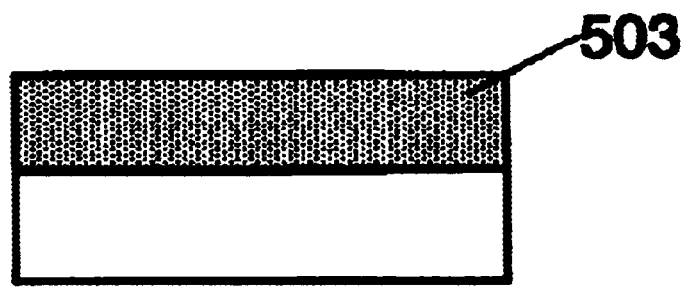

First, there is formed the nickel thick film 503 for constituting a structural body material layer on a surface of the chromium substrate 501 for constituting a base substrate by electroplating in a solution including nickel sulfamate (FIG. 6(B)). Similar to Embodiment 1, a film thickness of the nickel thick film 503 in this case, needs to be the same as a thickness of a part constituting an object. Further, when conditions coincide, a plating bath except nickel sulfamate or a method except plating can be used similar to Embodiment 1.

Figure 6C:
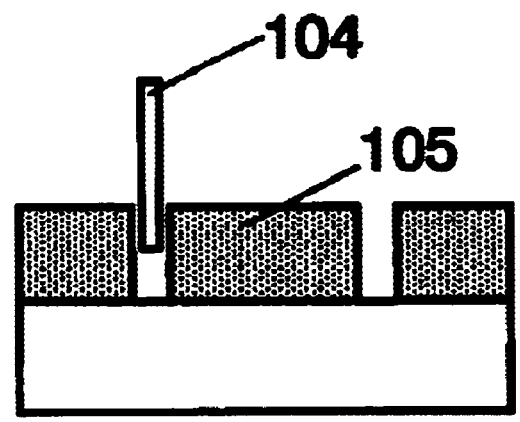
Figure 6D:
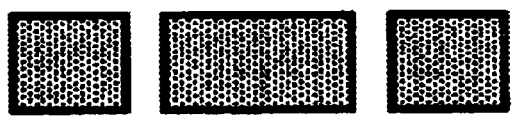
Figure 6E:
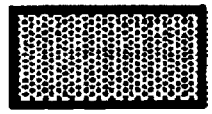

Next, a groove having predetermined width and depth is machined along an outer configuration shape of a part constituting an object at the nickel thick film 503 (FIG. 6(C)). Thereby, the nickel thick film 503 is separated into the part 105 and other portion. Finally, by removing only the chromium substrate 501 (FIG. 6(D)), the part 105 is separated from the chromium substrate 501 (FIG. 6(E)). As a method of selectively removing the chromium substrate 501, the substrate is dipped in a solution that does not dissolve nickel but dissolve only chromium, or the substrate is etched electrochemically by applying voltage for selectively dissolving only chromium.

Although according to the embodiment, chromium is used as material of the base substrate and nickel is used as the structural body material layer, other material can be used when the following conditions are satisfied.

(1) A base substrate can be used so far as a material thereof is provided with conductivity and excellent adherence with the part material and capable of being selectively removed without influencing the part material in removing the material.

(2) A structural body material layer can be used so far as a material thereof is a material capable of being deposited to a final thickness of a part and a material a portion of which can be selectively machined by electrochemical reaction.

With regard to the machining electrode 104, conditions similar to those of Embodiment 1 need to satisfy.

Embodiment 3

According to the embodiment, an explanation will be given of a case of fabricating a part which does not include a movable portion by using a nickel substrate as a base substrate and a nickel thick film as a structural body material layer.

FIG. 7 shows an outline of a process when a part is fabricated by the method of fabricating a part according to the invention.

Figure 7A:
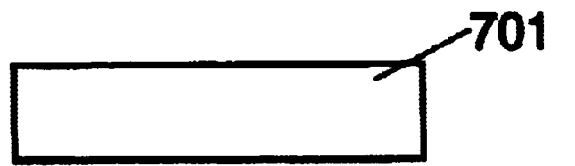
FIGS. 7A–7F are schematic views showing an example of a case of fabricating a part that does not include a movable portion according to Embodiment 3 of the method of fabricating a part according to the invention.
Figure 7B:

First, a nickel substrate 701 for constituting a base substrate is dipped in a solution of potassium bichromate to thereby form a peeling layer 702 on its surface (FIG. 7(B)). The peeling layer 702 is a nickel oxide film formed by being oxidized by potassium bichromate.

By a length of a time period of being dipped in the potassium bichromate solution, a degree of easily peeling the layer formed thereon is changed and accordingly, a pertinent time period in dipping is set.

Figure 7C:
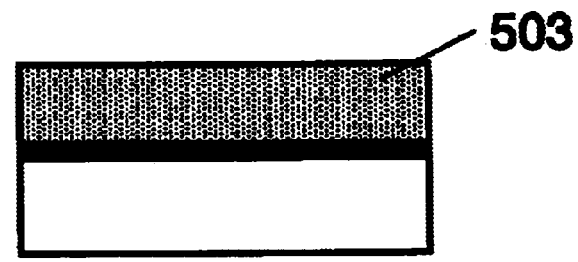
Figure 7D:
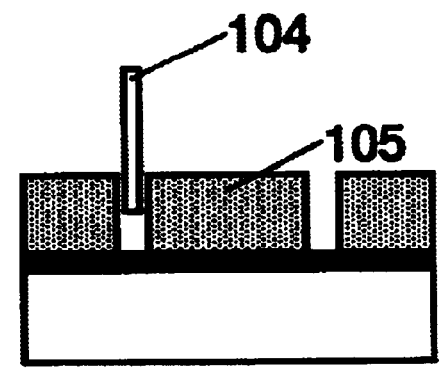
Figure 7E:
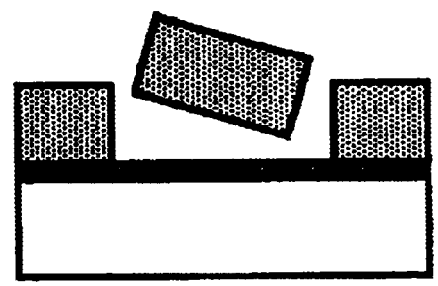
Figure 7F:
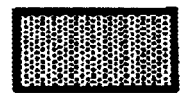

Next, there is formed the nickel thick film 503 for constituting a structural body material layer by electroplating in a solution including nickel sulfamate on a surface of the peeling layer 702 (FIG. 7(C)). Similar to Embodiment 1, a film thickness of the nickel thick film 503 in this case needs to be the same as a thickness of a part constituting an object. Further, when conditions coincide, there can be used a plating bath except nickel sulfamate or a method except plating similar to Embodiment 1. Next, there is machined a groove having predetermined width and depth along an outer configuration shape of a part constituting an object at the nickel thick film 503 (FIG. 7(D)). Thereby, the nickel thick film 503 using the machining electrode 104 is separated into the part 105 and other portion. Finally, by mechanically peeling only the part 105 from the peeling layer 702 (FIG. 7(E)), the part 105 is separated from the nickel substrate 701 (FIG. 7(F)).

Although according to the embodiment, there is used nickel as the material of the base substrate and nickel as the structural body material layer, other material can be used when the following conditions are satisfied.

(1) A base substrate can be used so far as a material thereof is a material having conductivity and capable of forming a peeling layer by chemically treating its surface.

(2) A structural body material layer can be used so far as a material thereof is a material capable of being deposited to a final thickness of a part and a material a portion of which can selectively be machined by electrochemical reaction.

With regard to the machining electrode 104, conditions similar to those of Embodiment 1 need to satisfy.

Embodiment 4

According to the embodiment, an explanation will be given of a case of fabricating a part having a movable structure at an inner portion thereof by using a chromium substrate as a base substrate, a copper thin film as a sacrificing layer and a nickel thick film as a structural body material layer.

FIG. 8 shows an outline of a process when a part is fabricated by the method of fabricating a part according to the invention.

Figure 8A:
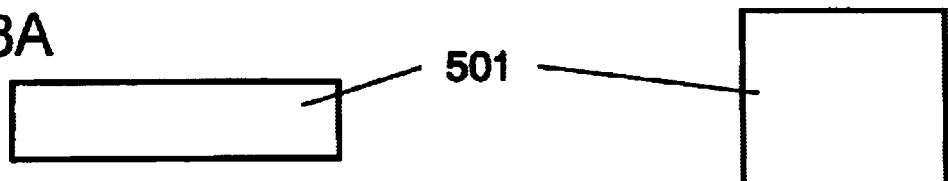
FIGS. 8A–8F are schematic views showing an example of a case of fabricating a part that includes a movable portion according to Embodiment 4 of the method of fabricating a part according to the invention.
Figure 8B:
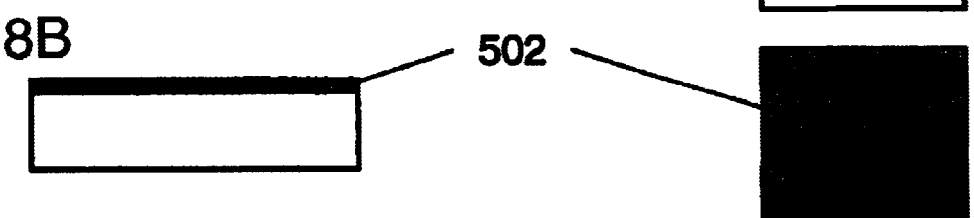
Figure 8C:

First, the chromium substrate 501 is polished and the copper thin film 502 for constituting a sacrificing layer is formed on its surface by electroplating in a solution including copper cyanide (FIG. 8(B)). As a plating bath used in the plating, there can be used a general copper plating bath normally used. A thickness of he sacrificing layer is preferable as thin as possible and when there is pin hole or non-uniformity in plating, a structural body material layer and a base substrate cannot be separated in a later step and accordingly, it is preferable to constitute the thickness of about 0.5 through several micrometers. However, the thickness is not limited to the range. Next, as shown by FIG. 8(C), a portion of the copper thin film 502 is removed to thereby expose a surface of the chromium substrate 501. The portion finally constitutes a structural body fixing portion 201 tightly attached with the nickel thick film 503 constituting the structural body material layer and the chromium substrate 501. Further, a similar result is achieved even by using a method of depositing the copper thin film 502 to expose the surface of the chromium substrate 501 for constituting the structural body fixing portion 201 in a step of forming the copper thin film 502 in place of the step.

Figure 8D:
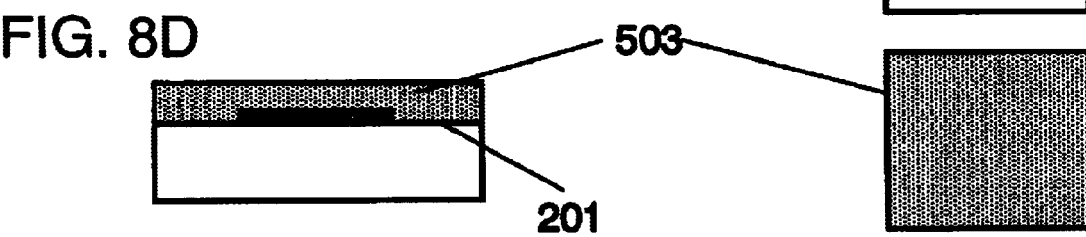

Next, the nickel thick film 503 for constituting the structural body material layer is formed on the copper thin film 502 by carrying out electroplating in a solution including nickel sulfamate (FIG. 8(D)). A film thickness of the nickel thick film 503 in this case needs to be the same as a thickness of a part constituting an object. According to the embodiment, a thickness of a part to be formed is comparatively large and therefore, there is used the nickel sulfamate bath for providing a plating film having small internal stress, however, there can be used other plating bath capable of forming a film having small internal stress.

Further, when a thickness of a part is thin, a thickness of a material layer is also thin and therefore, there can be used other plating bath, for example, watt bath, nickel chloride bath or the like generally used, or there can be used a method except plating such as vacuum deposition or sputtering method.

Figure 8E:
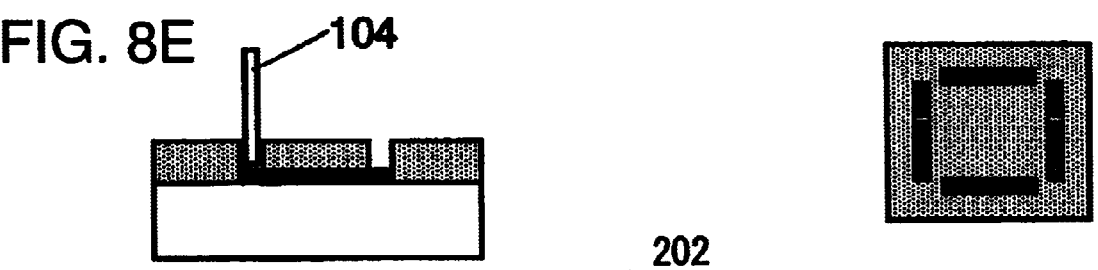
Figure 8F:

Next, there is machined a groove having predetermined shape, width and depth along an outer configuration shape of a movable part constituting an object at the nickel thick film 503 by using the machining electrode 104 (FIG. 8(E)). It is necessary that the portion of the groove formed at that occasion penetrates the nickel thick film 503 and the copper thin film 502 is exposed. Finally the movable portion 202 is separated from the chromium substrate 501 by selectively removing only the copper thin film 502 constituting a sacrificing layer. As a method of selectively removing only the copper thin film 502, the substrate is dipped in a solution which does not dissolve nickel and chromium but dissolves only copper, or the substrate is etched electrochemically by applying voltage for selectively dissolving only copper (FIG. 8(F)).

Although according to the embodiment, chromium is used as the material of the base substrate, copper is used as the material of the sacrificing layer and nickel is used as he structural body material layer, other material can also be used when the following conditions are satisfied.

(1) A base substrate having conductivity can be used.

(2) A sacrificing layer can be used so far as a material thereof is a material having conductivity and excellent adherence with the base substrate or the structural body material layer and capable of being selectively removed without influencing the base substrate or the structural body material layer in removing the sacrificing layer.

(3) A structural body material layer can be used so far as a material thereof is a material capable of being deposited up to a final thickness oaf structural body and a material a portion of which can selectively be removed by electrochemical reaction.

With regard to the machining electrode 104, conditions similar to those of Embodiment 1 need to satisfy.

Embodiment 5

According to the embodiment, an explanation will be given of a case of fabricating a part having a movable structure at an inner portion thereof by using a nickel substrate as a base substrate and a nickel thick film for a structural body material layer. FIG. 9 shows an outline of a process when a part is fabricated by the method of fabricating a part according to the invention.

Figure 9A:
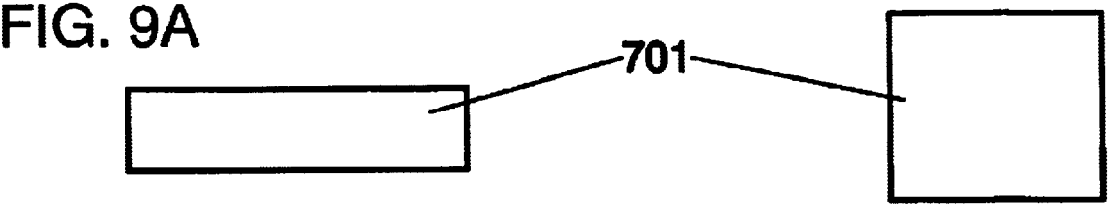
FIGS. 9A–9E are schematic views showing an example of a case of fabricating a part that includes a movable portion according to Embodiment 5 of the method of fabricating a part according to the invention.
Figure 9B:
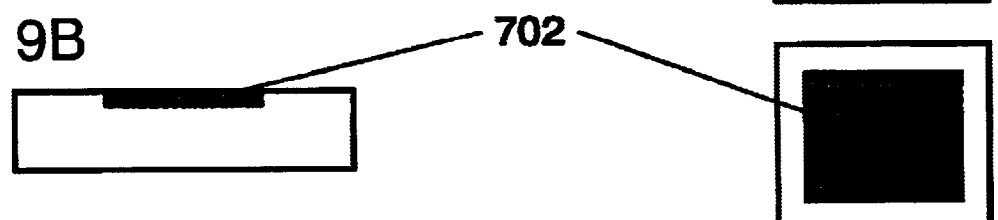

First, a nickel substrate 701 for constituting a base substrate is polished and dipped in a solution of potassium bichromate to thereby form a peeling layer 702 on its surface (FIG. 9(B)). At this occasion, the peeling layer 702 is formed not on an entire face of a surface of the nickel substrate 701 but a partial area thereof and a remaining portion thereof is brought into a state in which the surface of the nickel substrate 701 is exposed. The exposed portion of the surface of the nickel substrate 701 constitutes the structural body fixing portion 201 tightly attached with the nickel thick film 503 finally constituting the structural body material layer and the nickel substrate 701 and therefore, it is further preferable when there is formed the peeling layer 702 in a shape in conformity with a final shape of the movable portion 202. Further, the peeling layer 702 is a nickel oxide film formed by nickel's being oxidized by potassium bichromate, a degree of easily peeling a layer formed thereon is changed by a length of a time period of being dipped in the potassium bichromate solution and therefore, a pertinent dipping time period is set.

Figure 9C:
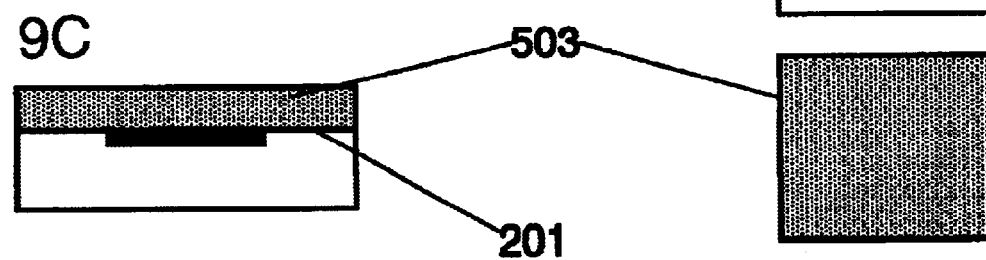

Next, there is formed a nickel thick film 503 for constituting a structural body material layer on a surface of the peeling layer 702 by electroplating in a solution including nickel sulfamate (FIG. 9(C)). Similar to Embodiment 4, a film thickness of the nickel thick film in this case needs to be the same as a thickness of a structural body constituting an object. Further, when conditions coincide, there can be used a plating bath except potassium sulfamate or a method except plating similar to Embodiment 4.

Figure 9D:
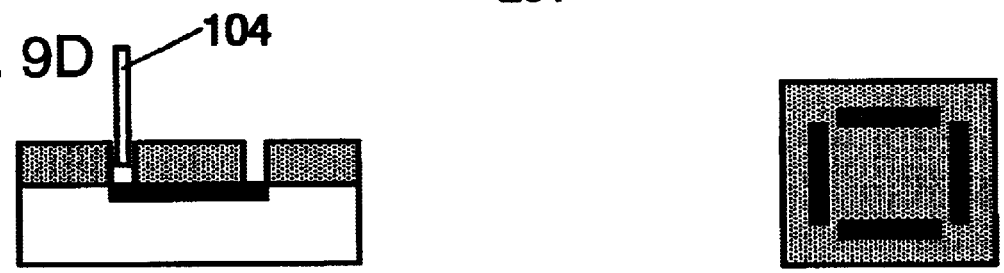
Figure 9E:
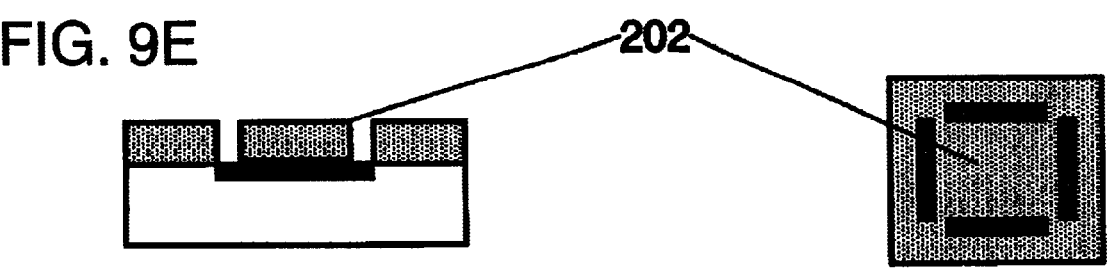

Successively, there is machined a groove having predetermined shape, width and depth along an outer configuration shape of a movable portion structural body constituting an object at the nickel film 503 constituting the structural body material layer by using the machining electrode 104 (FIG. 9(D)). Finally, at a portion of the peeling layer 702, the movable portion 202 is mechanically peeled from the nickel substrate 701 and the movable portion 202 can be moved relative by to the nickel substrate 701 (FIG. 9(B)).

Although according to the embodiment, nickel is used as the material of the substrate and nickel is used as the part material layer, other material can also be used when the following conditions are satisfied.

(1) A base substrate can be used so far as a material thereof is a material having conductivity and capable of forming a peeling layer by chemically treating its surface.

(2) A structural body material layer can be used so far as a material thereof is a material capable of being deposited to a final thickness of a structural body and a material a portion of which can selectively be machined by electrochemical reaction.

With regard to the machining electrode 104, conditions similar to those of Embodiment 1 need to satisfy.

Embodiment 6

According to the embodiment, an explanation will be given of a specific procedure in machining the nickel thick film 503 by the machining electrode 104 in Embodiments 1 through 5.

Figure 10:
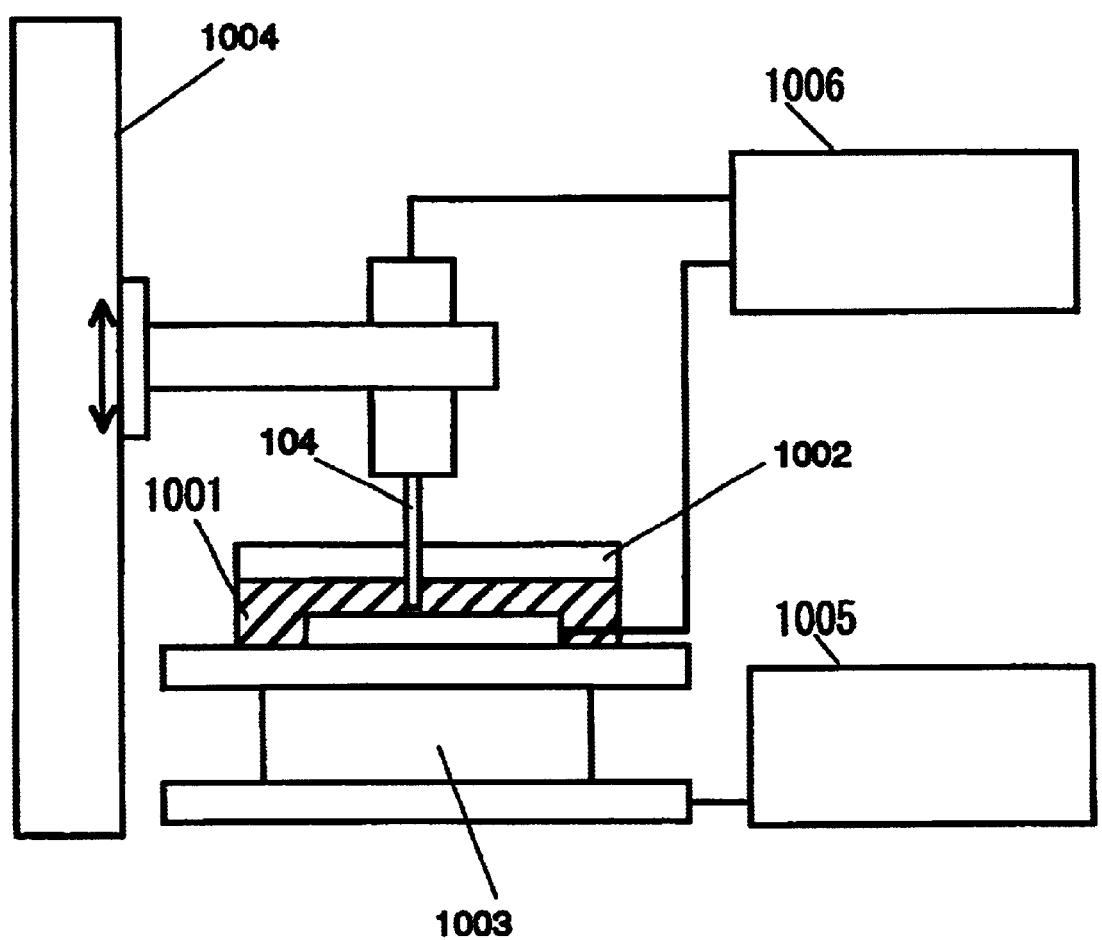
FIG. 10 is a view showing an example of an apparatus for carrying out steps of shaping a part by using the method of fabricating a part according to Embodiment 6 of the invention.

As a machining apparatus used here, for example, a constitution shown in FIG. 10 can be used. In FIG. 10, a machining object 1001 is installed in a machining solution vessel 1002 filled with a machining solution and the machining electrode 104 is installed oppositely to the machining object 1001. Further, the machining object 1001 in this case designates a base substrate formed with a part material layer.

The machining solution vessel 1002 is installed above an XY axes stage 1003 integral with the machining object 1001 installed at an inner portion thereof and capable of being moved in X axis and Y axis directions, meanwhile, the machining electrode 104 is installed at a Z axis stage movable in 2 axis direction via a supporter. Further, the XY axes stage 1003 and the Z axis stage 1004 are connected to a control apparatus 1005 and the machining object 1001 and the machining electrode 104 can be moved respectively to arbitrary positions based on information of coordinate position and moving speed from the control apparatus 1005.

Meanwhile, the machining object 1001 and the machining electrode 104 are connected to a programmable power source 1006 capable of applying arbitrary voltage therebetween. A potentio/galvanostat can also be used for the programmable power source 1006.

The machining electrode 104 formed generally in a rodlike shape and is machined in a diameter and a length in conformity with a shape of fabrication. Further, in order to promote resolution of fabrication, according to the machining electrode 104, only a portion of a front end portion thereof is exposed and other portion thereof is covered by an insulator. As the machining electrode 104, there can be used a material which is chemically stable in a machining solution of, for example, carbon, tungsten, platinum or the like.

In carrying out fabrication by the above-described constitution, firstly, a separating distance is controlled such that a distance between the machining object 1001 and the machining electrode 104 constitutes a predetermined interval, successively, the XY axes stage 1003 is driven by the control apparatus 1005 such that while applying predetermined voltage between the machining object 1001 and the machining electrode 104 by the programmable power source 1006, at the same time, a front end of the machining electrode 104 is moved along an outer configuration shape of a part to be machined above the machining object 1001.

There is repeated, several times, a step of readjusting the distance between the machining object 1001 and the machining electrode 104 and thereafter moving the machining object 1001 while applying voltage as necessary. Thereby, a groove is formed at the machining material layer along the outer configuration shape of the part to thereby separate the machining material layer into a part portion and other portion.

Embodiment 7

According to the embodiment, an explanation will be given of an embodiment of a case of carrying out steps of forming a sacrificing layer, a peeling layer and a structural body material layer and machining to shape a part by the same apparatus.

Figure 11:
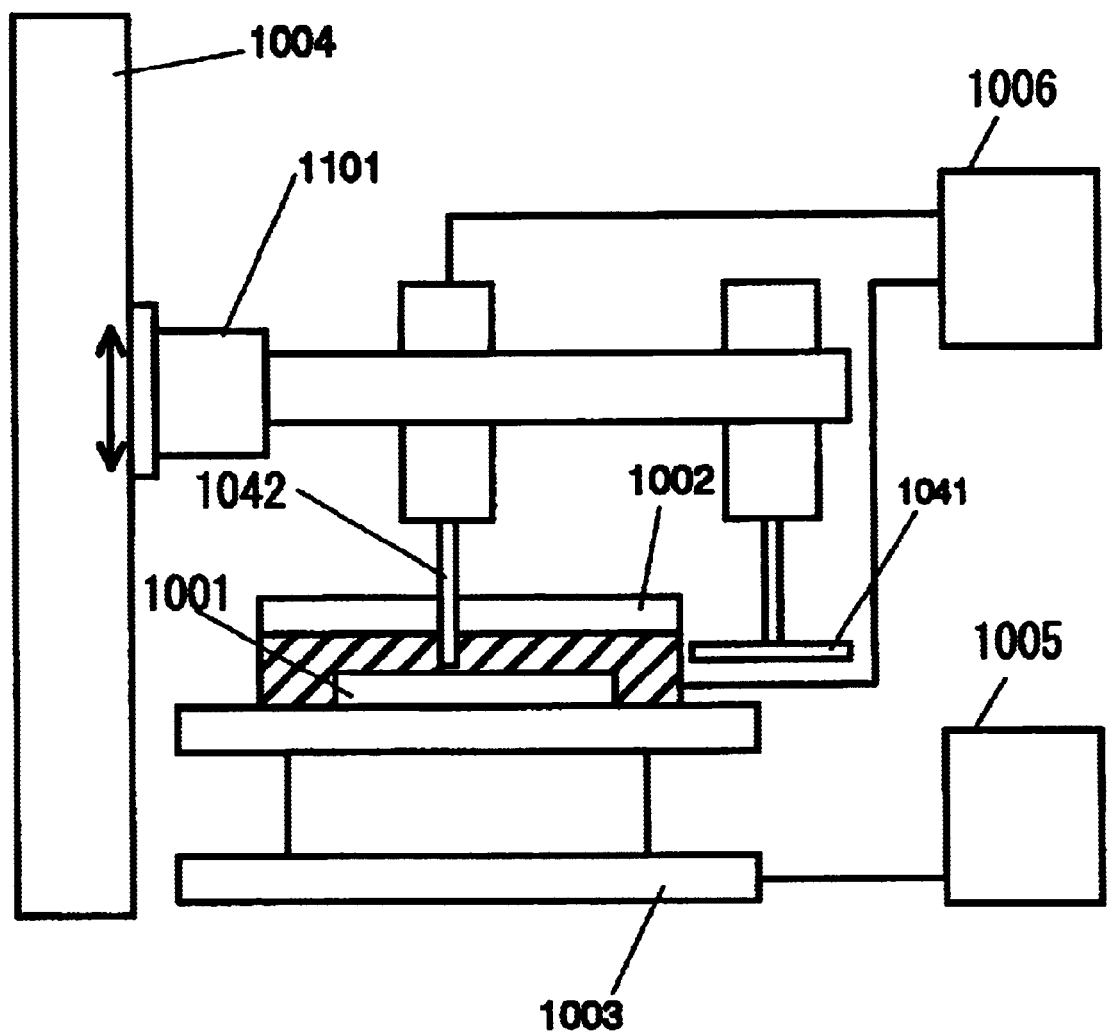
FIG. 11 is a view showing an example of an apparatus for carrying out steps of shaping a part by using the method of fabricating a part according to Embodiment 7 of the invention.

As a machining apparatus used here, a constitution shown by, for example, FIG. 11 can be utilized. Although a large portion of a constitution of FIG. 11 is similar to that in the case of Embodiment 6, the constitution differs therefrom in that there are two kinds of a plating electrode 1041 and a shaping electrode 1042 as the machining electrode 104 and the electrodes used can be selected by a machining electrode switch mechanism 1101.

When a part is fabricated in proportion to the method shown in Embodiment 1 and Embodiment 4 by using the apparatus, firstly, a plating solution of a sacrificing layer is introduced into the machining solution vessel 1002. Next, the plating electrode 1041 is arranged right above the machining object by the machining electrode'switching mechanism 1101, further, a separating distance is adjusted by the Z axis stage 1004 such that the distance between the plating electrode 1041 and the machining object 1001 becomes a predetermined interval.

Next, a predetermined thickness of a sacrificing layer is formed on the base substrate by applying voltage between the machining object 1001 and the plating electrode 1041 by the programmable power source 1006 by a predetermined amount of voltage and for a predetermined period of time.

Successively, inside of the machining solution vessel 1002 is exchanged by a plating solution of a structural body material layer and the structural body material layer is formed on the sacrificing layer by a similar procedure. When the structural body material layer is formed, the shaping electrode 1042 is selected by the machining electrode switch mechanism 1101 and thereafter, the structural body material layer is machined in proportion to the steps shown in Embodiment 1 and Embodiment 4.

When the substrate is etched electrochemically by applying voltage of selectively dissolving only the sacrificing layer in removing the sacrificing layer finally, the sacrificing layer can also be removed by switching the electrode to the electrode plating electrode 1041 again by the machining electrode switch mechanism 1101 and applying predetermined voltage between the plating electrode 1041 and the machining object 1001.

Even when the substrate is fabricated by the method shown in Embodiment 3 and Embodiment 5 by using the apparatus shown in FIG. 11, a method corresponding to the above-described is applicable. In this case, in place of plating the sacrificing layer, there are carried out steps of introducing a surface treatment solution for forming the peeling layer 702 into the machining solution vessel 1002 and dipping the machining object 1001 therein for a predetermined period of time. Further, when it is necessary to pattern the peeling pattern 702 to thereby expose the surface of the base substrate, after forming the peeling layer 702, there is introduced a machining solution for removing the peeling layer 702 into the machining solution vessel 1002 and the shaping electrode 1042 is selected by the machining electrode switch mechanism 1101. Further, the substrate may be machined such that in a state in which voltage having predetermined waveform and frequency is applied between the shaping electrode 1042 and the machining object 1001, the peeling layer 702 is patterned by moving the both members relatively to each other to thereby expose the surface of the base substrate at the portion of the structural body fixing portion 201.

Embodiment 8

According to the embodiment, an explanation will be given of a case of fabricating a part having the movable portion 202 in a complicated shape. FIG. 12 and FIG. 13 show a method of forming a comb-type actuator part by the method of fabricating a part according to the invention. In this case, the chromium substrate 501 is used for a base substrate, the copper thin film 502 is used for a sacrificing layer, the nickel thick film 503 is used for a structural body material layer and the machining apparatus of FIG. 11 explained in Embodiment 7 is used.

Figure 12A:
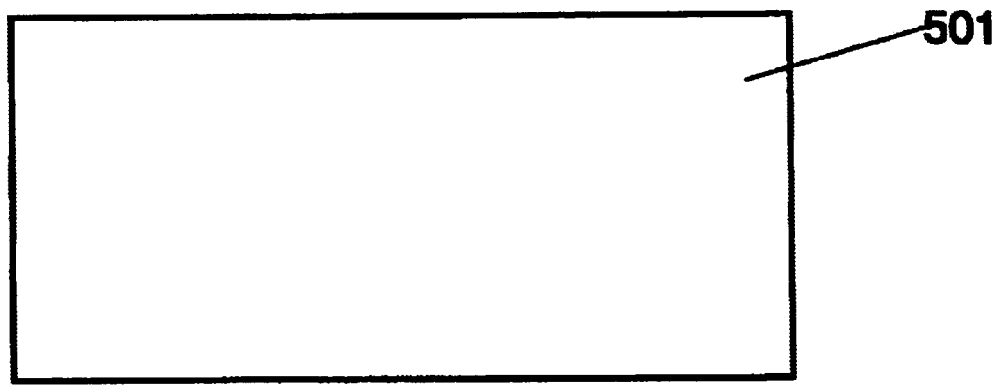
FIGS. 12A–12C are schematic views showing fabricating steps in a case of forming a movable portion having a complicated shape by the method of fabricating a part according to Embodiment 8 of the invention.
Figure 12B:
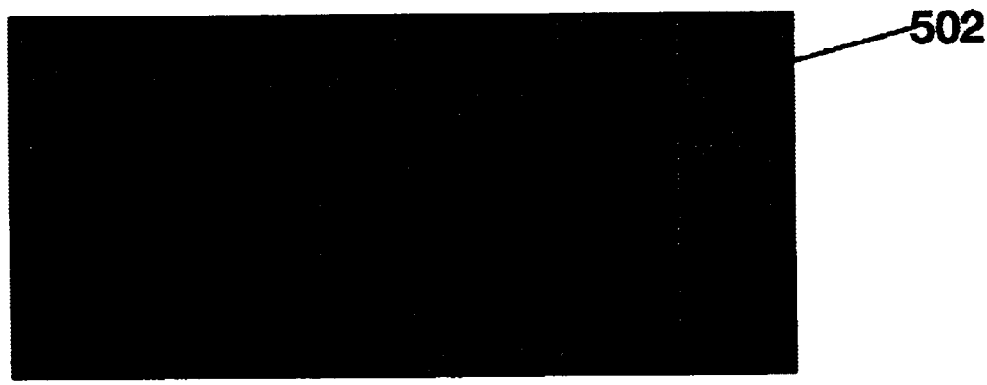
Figure 12C:
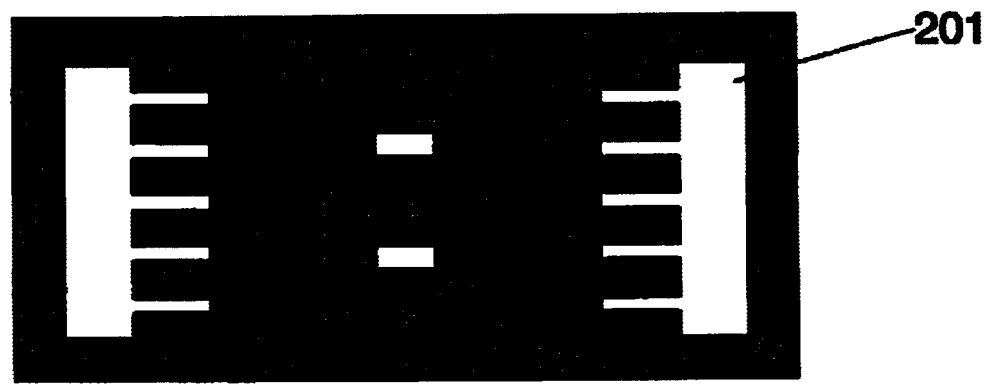
Figure 13A:
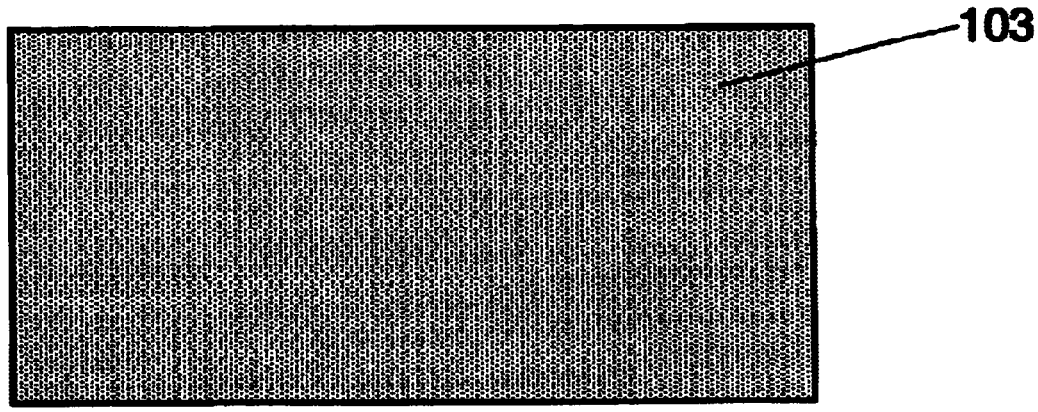
FIGS. 13A–13C are schematic views showing continuation of the fabricating steps in the case of forming the movable portion having the complicated shape by the method of fabricating a part according to Embodiment 8 of the invention.
Figure 13B:
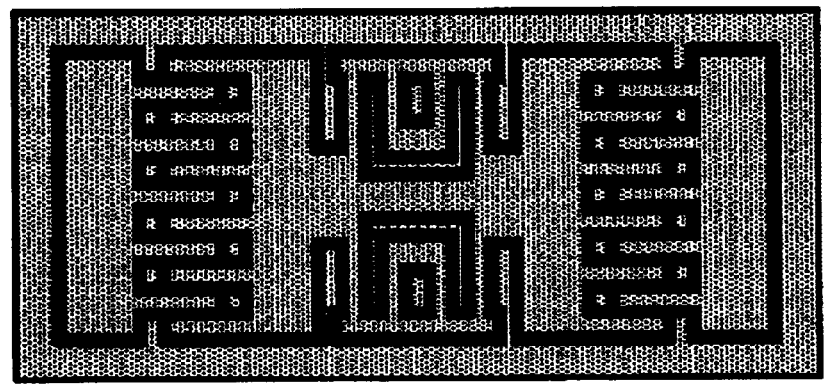

First, the copper thin film 502 for constituting the sacrificing layer is formed on an entire surface of the chromium substrate 501 by electroplating in a solution including copper cyanide (FIG. 12(A)). The fabrication object 1001 is constituted thereby and is installed in the machining solution vessel 1002 filled with the copper cyanide solution. In a state in which the operating electrode for plating 1041 is selected by the machining electrode switch mechanism 1101 and arranged to be opposed to the fabrication object 1001 in the copper cyanide solution, voltage having pertinent waveform and frequency or direct current voltage is applied therebetween to thereby form a copper thin film having a pertinent film thickness on a chromium substrate (FIG. 12(B)). Next, inside of the machining solution vessel 1002 is exchanged by an electrolytic etching solution of copper, and the shaping electrode 1024 is selected by the machining electrode switch 1101. Here, an aqueous solution including sodium nitrate or the like can be used as the electrolytic etching solution.

The separating distance is controlled such that a distance between the shaping electrode 1042 and the machining object 1001 constitutes a predetermined interval, and successively, while applying voltage having predetermined waveform and frequency between the machining object 1001 and the shaping electrode 1042 by the programmable power source 1006, the same time, the XY axes stage 1003 is driven by the control apparatus 1005. By the step, the structural body fixing portion 201 is formed at a portion of the copper thin film constituting the sacrificing layer (FIG. 12(C)).

Successively, inside of the machining solution vessel 1002 is exchanged by a nickel plating solution and the plating electrode 1041 is selected by the machining electrode switch mechanism 1101. In a state in which the plating electrode 1041 is arranged to be opposed to the machining object 1001 in the nickel plating solution, by applying voltage having pertinent waveform and frequency or direct current voltage therebetween, the nickel thick film 503 constituting the structural body material layer having a pertinent film thickness is formed on the copper thin film 502 constituting the sacrificing layer (FIG. 13(A)).

Further, inside of the machining solution vessel 1002 is exchanged by an electrolytic solution etching of nickel and the shaping electrode 1042 is selected by the machining electrode switch mechanism 1101. By the step shown in Embodiment 5, a groove having a predetermined pattern is machined at the structural body material layer 103 (FIG. 13(B)). In the machining step, it is not necessary to remove all of the unnecessary structural body material layer but when the groove is formed to separate from the part fixing portion of the structural body material, in a step of removing the sacrificing layer thereafter, the unnecessary structural body material layer can also be removed along therewith. The fact shows that according to the method of forming a part of the invention, a time period required in shaping the structural body material layer by the electrolytic machining can be shortened to a minimum.

Figure 13C:
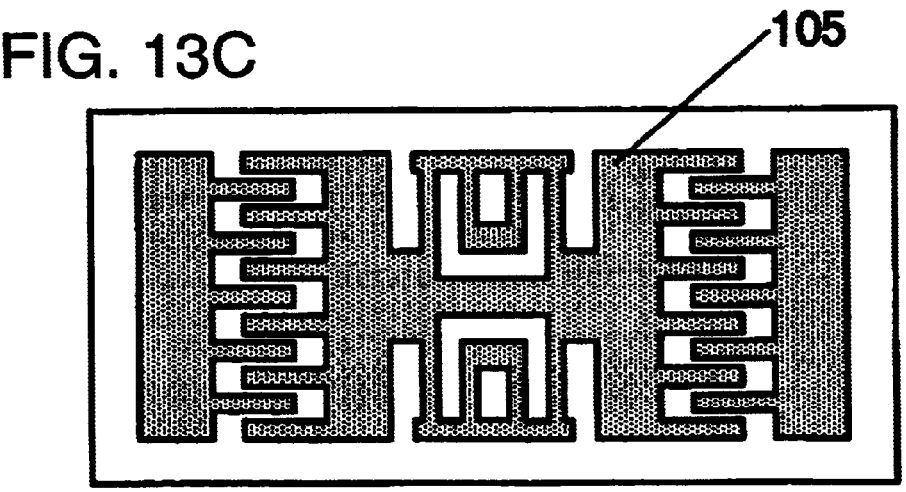

Finally, by introducing a solution for etching the copper thin film 502 constituting the sacrificing layer into the machining solution vessel 1002 and selectively removing only the copper thin film 502, the structural body having the movable portion is completed (FIG. 13(C)).

According to a method of fabricating a part of the invention, there are achieved effects of resolving the problems in the conventional method of fabricating a part such that:

(1) In shaping a part, only a material at a vicinity on an outer configuration of line of the part is removed and therefore, the material is not wasted and only a short period of fabrication is needed.

(2) By a single fabricating machine, a complicated shape can be processed and when the method shown in Embodiment 7 is used, an intermediary layer and a material layer can be formed in the same apparatus and therefore, apparatus cost can be reduced.

(3) Fabrication is carried out in a state of non-contact of a fabricating electrode and a fabrication object and therefore, a fabricating tool is not dissipated. Further, physical force is not operated between a fabricating electrode and a fabrication object and therefore, there is no restriction in sizes of the both.

(4) Owing to fabrication utilizing chemical reaction, even in a step of forming an intermediary layer or a material layer, a step of shaping a part, or a step of removing an intermediary layer or a base substrate, it is not necessary to apply high voltage and energy consumption is reduced. Further, since the applied energy is small, formation of an affected layer on a surface of a fabrication object is restrained to reduce.

Further, when a part including a movable portion is fabricated by the method of fabricating a part of the invention, there can be achieved effects as follows:

(5) Different from the case of using a machining method or the like, a step of assembling parts is not needed and therefore, even when a size of a movable structural body intended to fabricate is small, there poses no problem that a part is distracted in assembling, or assembling cannot be carried out while maintaining necessary accuracy.

(6) Although a movable portion is formed by patterning a thin film or a thick film deposited on a substrate in a shape of a layer, the patterning is not carried out by photolithography but by electrolytic machining method is used and therefore, even when a thickness of a structural body material to be patterned becomes thick, there can be avoided a problem that shape accuracy of a pattern is deteriorated by undercut, or a problem of durability of a photoresist by being dipped in an etching solution for a long time.

(7) An arbitrary shape of a movable portion can basically be selected at the site and therefore, it is not necessary to previously fabricate a mask in conformity with the shape as in the case of utilizing a photolithography method. Therefore, when a shape is optimized while fabricating the shape actually, a result can be achieved in a short period of time at low cost.

(8) When a wet process is used in processes of forming a sacrificing layer, a peeling layer and a structural body and removing the sacrificing layer, all the steps can be carried out by a single apparatus and a movable structural body can be fabricated in a short period of time at low cost. Further, automation of steps can be realized comparatively easily because the steps can be carried out by the single apparatus.

What is claimed is:

1. A method of fabricating a part comprising the steps of:
    forming a sacrificial material layer on a base material;
    forming a part forming layer on a surface of the sacrificial material layer of a material different from that of the sacrificial material layer;
    shaping the part forming layer by a machining process to define an outer configuration of the part; and
    separating the shaped part forming layer from the base material to obtain a fabricated part by selectively removing only the sacrificial material layer.

2. A method of fabricating a part according to claim 1; wherein the step of shaping the part forming layer step comprises the step of forming a groove having a predetermined width in the part forming layer along the outer configuration of the part by the machining process.

3. A method of fabricating a part according to claim 2; wherein the machining process used in the step of shaping the part forming layer comprises the steps of arranging a machining electrode having a desired shape in a machining solution opposed to the part forming layer, and moving at least one of the machining electrode and the part forming layer relative to the other along a path corresponding to the outer configuration of the part while applying a voltage between the part forming layer and the machining electrode.

4. A method of fabricating a part comprising the steps of:
    forming a part forming layer on a base material of a material different from that of the base material;
    shaping the part forming layer by a machining process to define an outer configuration of the part; and
    separating the shaped part forming layer from the base material to obtain a fabricated part by selectively removing at least a portion of the base material.

5. A method of fabricating a part according to claim 4; wherein the step of shaping the part forming layer comprises the step of forming a groove having a predetermined width in the part forming layer along the outer configuration of the part by the machining process.

6. A method of fabricating a part according to claim 5; wherein the machining process used in the step of shaping the part forming layer comprises the steps of arranging a machining electrode having a pertinent shape in a machining solution opposed to the part forming layer, and moving at least one of the machining electrode and the part forming layer relative to the other along a path corresponding to the outer configuration of the part while applying a voltage between the part forming layer and the machining electrode.

7. A method of fabricating a part comprising the steps of:
    forming a peeling layer on a surface of a base material by subjecting the base material to a surface treatment;
    forming a part forming layer on a surface of the peeling layer;
    shaping the part forming layer by a machining process to define an outer configuration of the part; and
    separating the shaped part forming layer from the base material at the surface of the peeling layer to obtain a fabricated part.

8. A method of fabricating a part according to claim 7; wherein the step of shaping the part forming layer comprises the step of forming a groove having a predetermined width in the part forming layer along the outer configuration of the part by the machining process.

9. A method of fabricating a part according to claim 8; wherein the machining process used in the step of shaping the part forming layer comprises the steps of arranging a machining electrode having a pertinent shape in a machining solution opposed to the part forming layer, and moving at least one of the machining electrode and the part forming layer relative to the other along a path corresponding to the outer configuration of the part while applying a voltage between the part forming layer and the machining electrode.

10. A method of fabricating a part having a fixed portion and a movable portion, comprising the steps of:
    forming a sacrificial material layer on a base material;
    removing a portion of the sacrificial layer to expose a portion of the base material;
    forming a part forming layer on a surface of the sacrificial material layer and the exposed portion of the base material, the part forming layer being comprised of a material different from that of the sacrificial material layer;

shaping a portion of the part forming layer formed on the sacrificial material layer using a machining process to define an outer configuration of the movable portion of the part; and separating the part forming layer except for the fixed portion from the base material by selectively removing only the sacrificial layer to thereby form the movable portion of the part, so that the movable portion of the part is movable relative to the base material and the fixed portion of the part is fixed relative to the base material.

11. A method of fabricating a part according to claim 10; wherein the step of shaping a portion of the part forming layer comprises the step of forming a groove having a predetermines width in the part forming layer along the outer configuration of the movable portion of the part by the machining process.

12. A method of fabricating a part according to claim 11; wherein the machining process used in the step of shaping a portion of the part forming layer comprises the steps of arranging a machining electrode having a desired shape in a machining solution opposed to the part forming layer, and moving at least one of the machining electrode and the part forming layer relative to the other along a path corresponding to the outer configuration of the part while applying a voltage between the part forming layer and the machining electrode.

13. A method of fabricating a part having a fixed portion and a movable portion, comprising the steps of:

forming a sacrificial material layer to cover a surface of a base material except for an exposed portion of the base material surface on which a fixed portion of the part is to be formed;

forming a part forming layer on a surface of the sacrificial material layer and the exposed portion of the base material surface, the part forming layer being comprised of a material different from that of the sacrificial material layer;

shaping a portion of the part forming layer formed on the sacrificial material layer using a machining process to define an outer configuration of the movable portion of the part; and separating the part forming layer except for the fixed portion from the base material by selectively removing only the sacrificial layer to thereby form the movable portion of the part, so that the movable portion of the part is movable relative to the base material and the fixed portion of the part is fixed relative to the base material.

14. A method of fabricating a part according to claim 13; wherein the step of shaping a portion of the part forming layer comprises the step of forming a groove having a predetermined width in the part forming layer along the outer configuration of the movable portion of the part by the machining process.

15. A method of fabricating a part according to claim 14; wherein the machining process used in the step of shaping a portion of the part forming layer comprises the steps of arranging a machining electrode having a desired shape in a machining solution opposed to the part forming layer, and moving at least one of the machining electrode and the part forming layer relative to the other along a path corresponding to the outer configuration of the part while applying a voltage between the part forming layer and the machining electrode.

16. A method of fabricating a part having a fixed portion and a movable portion, comprising the steps of:

forming a peeling layer to cover a surface of a base material except for an exposed portion of the base material surface on which a fixed portion of the part is to be formed;

forming a part forming layer on a surface of the peeling layer and the exposed portion of the base material surface;

shaping a portion of the part forming layer formed on the peeling layer using a machining process to define an outer configuration of the movable portion of the part; and separating the part forming layer except for the fixed portion from the peeling layer to thereby form the movable portion of the part, so that the movable portion of the part is movable relative to the base material and the fixed portion of the part is fixed relative to the base material.

17. A method of fabricating a part according to claim 16; wherein the step of shaping a portion of the part forming layer comprises the step of forming a groove having a predetermined width in the part forming layer along the outer configuration of the movable portion of the part by the machining process.

18. A method of fabricating a part according to claim 17; wherein the machining process used in the step of shaping a portion of the part forming layer comprises the steps of arranging a machining electrode having a desired shape in a machining solution opposed to the part forming layer, and moving at least one of the machining electrode and the part forming layer relative to the other along a path corresponding to the outer configuration of the part while applying a voltage between the part forming layer and the machining electrode.

19. A method of fabricating a part according to claim 1; wherein the base material is a conductive material, and the sacrificial material layer is a conductive material that can be selectively etched without etching the based material or the part forming layer.

20. A method of fabricating a part according to claim 1; wherein the base material comprises a chromium substrate, the sacrificial material layer comprises a copper thin film formed by electroplating on the chromium substrate and having a thickness of 0.5 $\mu$m or more, and the part forming layer comprises a nickel thin film formed by electroplating on the copper thin film.

21. A method of fabricating a part according to claim 7; wherein the peeling layer comprises an oxidized surface layer formed by oxidizing a surface of the base material.

22. A method of fabricating a part according to claim 10; wherein the base material is a conductive material, and the sacrificial material layer is a conductive material that can be selectively etched without etching the based material or the part forming layer.

23. A method of fabricating a part according to claim 10; wherein the base material comprises a chromium substrate, the sacrificial material layer comprises a copper thin film formed by electroplating on the chromium substrate and having a thickness of 0.5 $\mu$m or more, and the part forming layer comprises a nickel thin film formed by electroplating on the copper thin film.

24. A method of fabricating a part according to claim 16; wherein the peeling layer comprises an oxidized surface layer formed by oxidizing a surface of the base material.

* * * * *